GEORGE SMITH.
Improvement in Sling for Hay Elevators.
No. 116,231. Patented June 20, 1871.
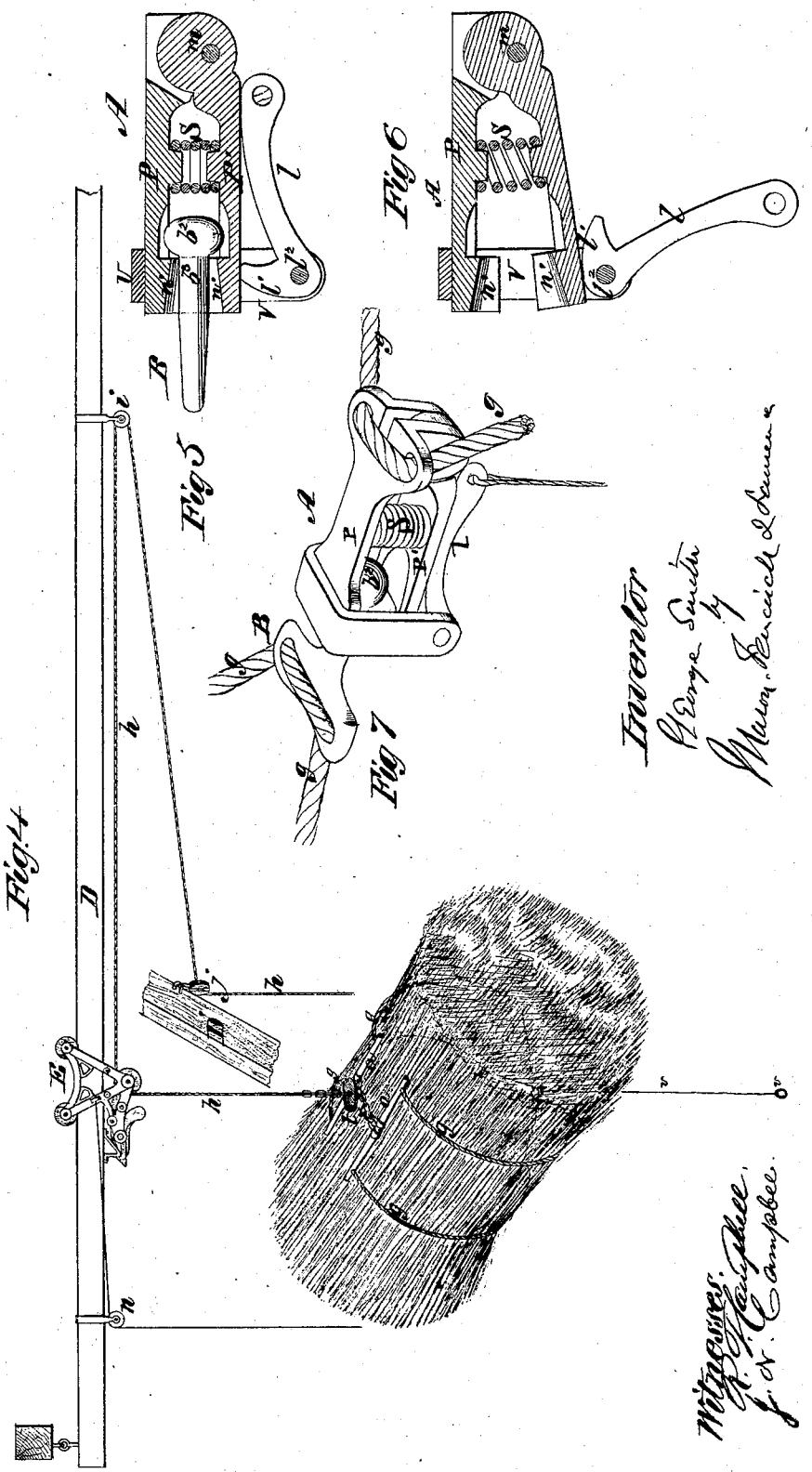

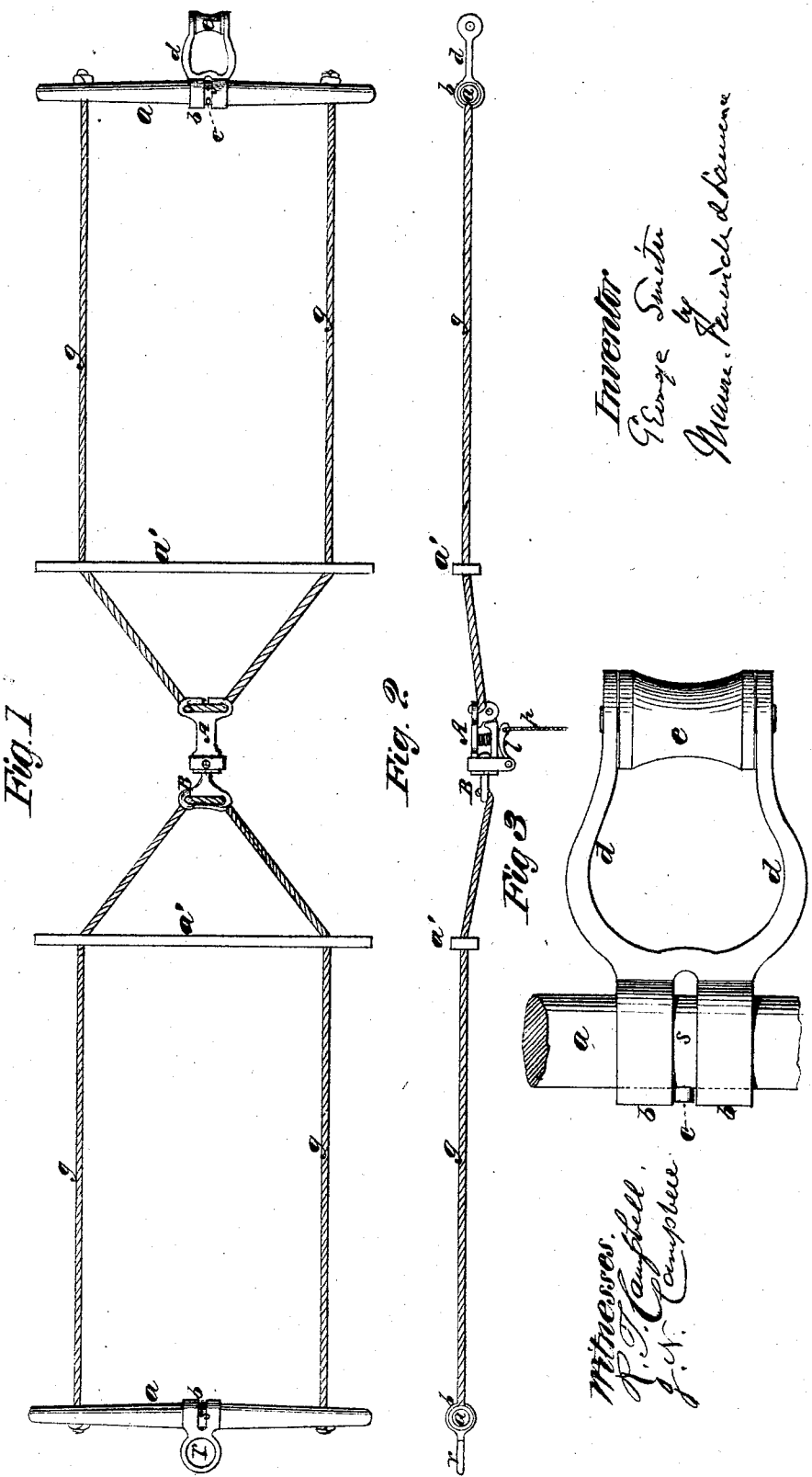

116,231

UNITED STATES PATENT OFFICE.

GEORGE SMITH, OF ROCHESTER, NEW YORK, ASSIGNOR TO JOHN C. DE LANY, OF DETROIT, MICHIGAN.

IMPROVEMENT IN SLINGS FOR HAY-ELEVATORS.

Specification forming part of Letters Patent No. 116,231, dated June 20, 1871.

*To all whom it may concern:*

Be it known that I, GEORGE SMITH, of Rochester, in the county of Monroe and State of New York, have invented a new and Improved Sling for Hay-Elevators; and I do hereby declare that the following is a full, clear, and exact description thereof, reference being had to the accompanying drawing making part of this specification, in which—

Figure 1, Plate 1, is a plan view of the sling. Fig. 2, Plate 1, is an edge view of the sling. Fig. 3, Plate 1, is a view of a swivel-loop with its anti-friction roller. Fig. 4, Plate 2, is a diagram showing an apparatus which may be used in connection with my sling for elevating and transporting a load. Figs. 5, 6, and 7, Plate 2, are views of the improved sling-lock.

Similar letters of reference indicate corresponding parts in the several figures.

This invention relates to certain novel improvements in the central discharge-slings which are employed in connection with elevating apparatus for unloading wagons of hay and other cut products, and delivering the loads upon mows in barns.

The following description will enable others skilled in the art to understand my invention.

In the accompanying drawing, Plate 1, I have represented my improved central discharge-sling spread out as would appear while lying upon a wagon, and in Fig. 4, Plate 2, I represent the sling embracing a body of hay and suspended from a carrier, E, which latter forms the subject of an application for a patent marked "Case A," and bearing even date with the filing of this. I do not claim the said carrier under this application; neither do I confine the claim herein made thereto. The sling is composed of two detachable sections, which are preferably made of an equal length, although one section may be longer than the other. Each section is composed of two longitudinal ropes, $g$ $g$, which are arranged parallel to each other and secured to a roller, $a$, and to a spreading-strip, $a'$, at a suitable distance apart. From the strip $a'$ the ropes converge and are passed through eyes that are made through one section of a locking device, which is used to connect the two sections around a mass of hay. The rope or ropes $g$ pass through the strips $a$ $a'$, and are suitably fastened thereto by nails driven through them. The roller $a$ of one section is provided with a pulley-loop, $d$, which has a concave pulley, $e$, applied to it to reduce friction on the elevating-rope when passed through this loop. It is attached to the roller $a$ by means of collars $b$ $b$, which are separated by an annular slot or space, $s$, and it is held at the middle of the length of the roller by means of a pin, $c$, which is inserted into the roller between the two collars $b$ $b$, as shown in Figs. 1 and 3. Thus applied the loop $d$ is allowed to swivel or turn around the roller, but prevented from lateral displacement thereon. The roller of the opposite sling-section has a ring, $r$, applied to it, so as to swivel precisely as described for the pulley-loop $d$. The locking device by which the two sling-sections are connected together consists of a tongue or male portion, B, attached to the rope $g$ of one sling-section, and a female portion, A, attached to the rope $g$ of the other section. The male portion consists of a rounded head, $b^2$, and a contracted neck, $b^3$, and a flattened extension, which is perforated to receive through it the rope $g$, as shown in Fig. 7. The female portion A consists of two oblong jaws, P P', which are pivoted together at $m$, and held between a strap, V, or the equivalent thereof. Between the jaws P P', and kept in place by bosses formed thereon, is a helical spring, S, the object of which is to force the jaws apart when they are released from a cam, $l^1$, on a tripping-lever, $l$. The free ends of the jaws are thickened, and constructed with outwardly-flaring grooves, $n'$ $n'$, which embrace the neck of the male portion B when closed on it, as shown in Fig. 5, and thus connect together the two portions A B. The tripping-lever $l$, to which the discharging-rope $v$ is attached, as shown in Fig. 4, is pivoted at $l^2$, between the lower extremities of the strap V, and constructed with a cam-shaped extension, $l^1$, on it, which, when the long arm of this lever is pressed up against the bottom of the jaw P', will close the two jaws and hold them safely in this condition, as shown in Fig. 5. When the load has been elevated to the proper height and moved over the mow, the person who is on the mow pulls the rope $v$, and thus allows the two jaws P P' to open and release the lower ends of the sling-sections and discharge the load. In Fig. 4 I have represented, in connection with my sling, an elevating apparatus, which consists of a carriage, E, rolling on a single elevated track, D, and moved in one direction by the hoisting-rope $h$, which passes around pulleys $i$ and $j$, and in the opposite direction by means of a rope, which is attached to the carriage and carried over a pulley, $n$, attached to the track D. Each sling, with its load, is removed from the wagon by passing the hook $t$, on the end of the hoisting-rope, through the swivel pulley-loop $d$, then over the load and attached to the swivel-ring $r$, the two sling-sections being, of course, connected by the locking device A B. When the horse, which is attached to the rope $h$, starts, the first operation is to draw together the two ends of the sling around the load, and thus compress it and hold it firmly. The next operation is to raise the load, release the carriage, and move the load over the mow, where it is to be discharged by an attendant pulling the tripping-rope $v$.

Having described my invention, what I claim as new, and desire to secure by Letters Patent, is—

1. A sectional hay-sling, which is composed of parallel ropes and cross-bars, in combination with loops or rings which are applied to the cross-bars $a\ a$ so as to swivel thereon, substantially as described.

2. The locking and unlocking device, consisting of a headed male portion, B, combined with spring pivoted jaws P P', embracing ends $n'\ n'$, and a tripping cam-lever, $l$, constructed substantially as described.

GEORGE SMITH.

Witnesses:
J. N. CAMPBELL,
EDM. F. BROWN.